United States Patent [19]

Baur et al.

[11] Patent Number: 5,188,758

[45] Date of Patent: * Feb. 23, 1993

[54] ELECTROOPTICAL DISPLAY ELEMENT USING A SUPERTWIST LIQUID CRYSTAL HAVING SPECIFIED ELASTIC CONSTANTS

[75] Inventors: Günter Baur, Freiburg, Fed. Rep. of Germany; Bernhard Scheuble, Yokohama, Japan; Waltraud Fehrenbach, Emmendingen, Fed. Rep. of Germany

[73] Assignee: Merck Patent Gesellschaft mit beschraenkter Haftung, Darmstadt, Fed. Rep. of Germany

[*] Notice: The portion of the term of this patent subsequent to Jan. 24, 2006 has been disclaimed.

[21] Appl. No.: 352,533

[22] Filed: May 15, 1989

Related U.S. Application Data

[60] Continuation-in-part of Ser. No. 257,565, Oct. 14, 1988, abandoned, which is a division of Ser. No. 130,388, Nov. 17, 1987, Pat. No. 4,799,774.

[30] Foreign Application Priority Data

Mar. 19, 1986 [DE] Fed. Rep. of Germany ....... 3609141

[51] Int. Cl.$^5$ .................... C09K 19/52; C09K 19/34; G02F 1/13
[52] U.S. Cl. .......................... 252/299.01; 252/299.61; 252/299.63; 359/92; 359/103
[58] Field of Search .................. 252/299.01, 299.61, 252/299.63; 350/346, 350 R

[56] References Cited

U.S. PATENT DOCUMENTS

| | | | |
|---|---|---|---|
| 4,222,887 | 9/1980 | Matsufuji | 350/350 R X |
| 4,261,651 | 4/1981 | Gray et al. | 350/350 R |
| 4,634,229 | 1/1987 | Amstutz et al. | 350/346 |
| 4,664,482 | 5/1987 | Kando et al. | 350/346 |
| 4,779,960 | 10/1988 | Kozaki et al. | 350/350 R X |
| 4,797,228 | 1/1989 | Goto et al. | 252/299.63 |
| 4,799,774 | 1/1989 | Baur et al. | 350/346 |
| 4,815,825 | 3/1989 | Nakagomi et al. | 350/346 X |
| 4,818,428 | 4/1989 | Scheuble et al. | 252/299.1 |
| 4,856,875 | 8/1989 | Kozaki et al. | 350/350 R X |
| 4,874,543 | 10/1989 | Yoshida | 252/299.61 |
| 4,886,344 | 12/1989 | Scheuble et al. | 350/350 R |
| 4,909,605 | 3/1990 | Asano et al. | 350/346 |
| 4,913,530 | 4/1990 | Ichimura et al. | 350/341 |
| 4,915,480 | 4/1990 | Petrzuka et al. | 350/350 R |
| 4,944,577 | 1/1990 | Yoshida et al. | 350/346 |

FOREIGN PATENT DOCUMENTS

| | | | |
|---|---|---|---|
| 0088433 | 6/1982 | Japan | 350/346 |
| 60-69936 | 4/1985 | Japan | 350/346 |
| 2145837 | 4/1985 | United Kingdom | 350/346 |
| 2168164 | 6/1986 | United Kingdom | 350/346 |
| 2172422 | 9/1986 | United Kingdom | 350/346 |

Primary Examiner—Robert L. Stoll
Assistant Examiner—C. Harris
Attorney, Agent, or Firm—Millen, White, Zelano and Branigan

[57] ABSTRACT

The invention relates to an electrooptical display element which can be multiplexed, has two support plates which, with an edging, form a cell containing a pneumatic liquid crystal material with positive dielectric anisotropy, and at least one chiral additive, and has a small surface tilt angle and a twist angle with a value between 150° and 250°, wherein the ratio of the elastic constants for bending and twisting $K_3/K_2$ of the liquid crystal material and the twist angle are such that when using liquid crystal material with the ratio of the elastic constants $K_3/K_1$ for mending and spreading, which is in the order of the maximum possible, the steepness of the characteristic line is approved by the characteristic line is bi-stable or when using liquid crystal material with the ratio of the elastic constants $K_3/K_1$ for bending and spreading either small enough or of the smallest order possible, the steepness of the characteristic line is improved but the characteristic line remains stable. The invention furthermore relates to a corresponding supertwist cell.

23 Claims, 11 Drawing Sheets

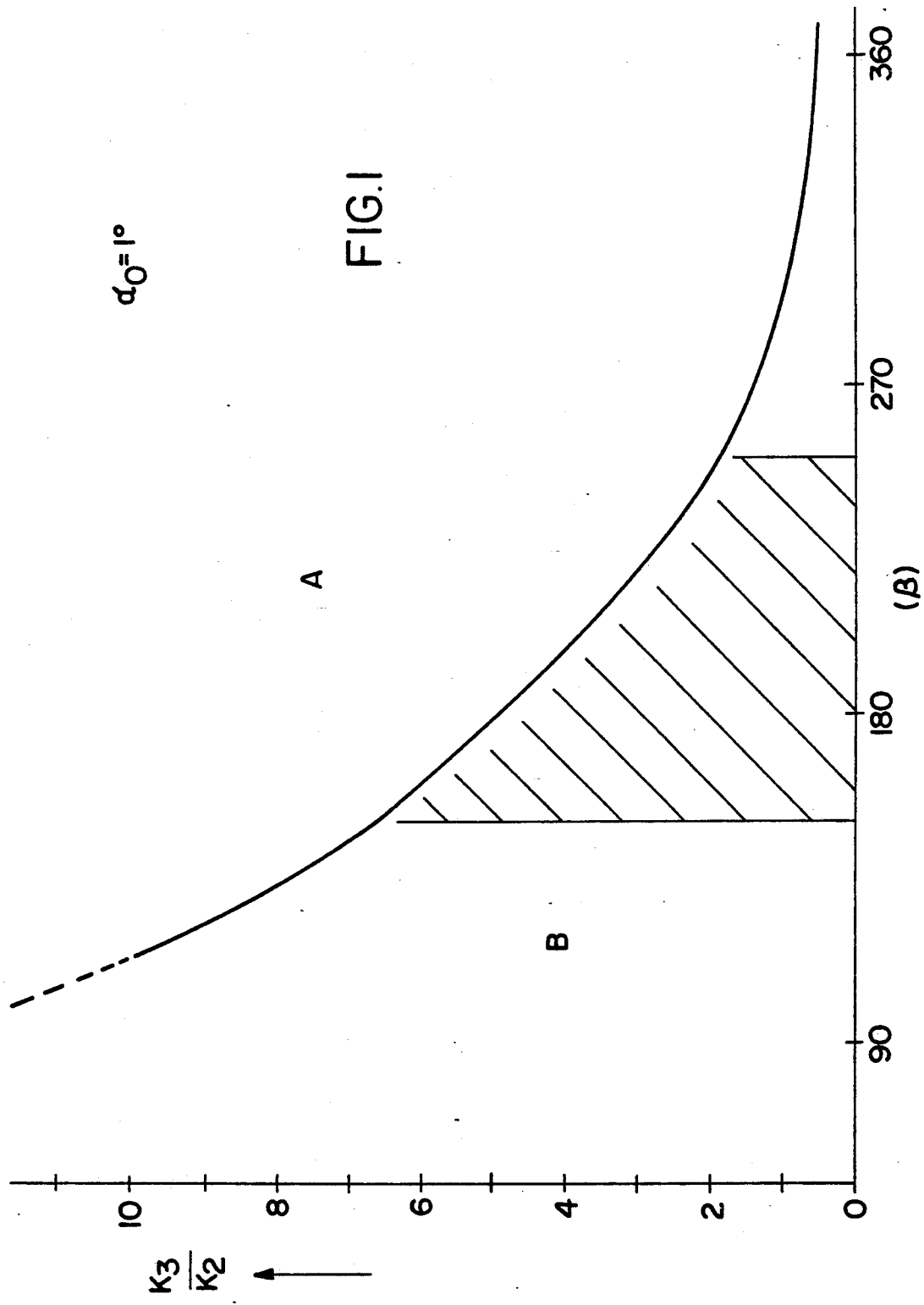

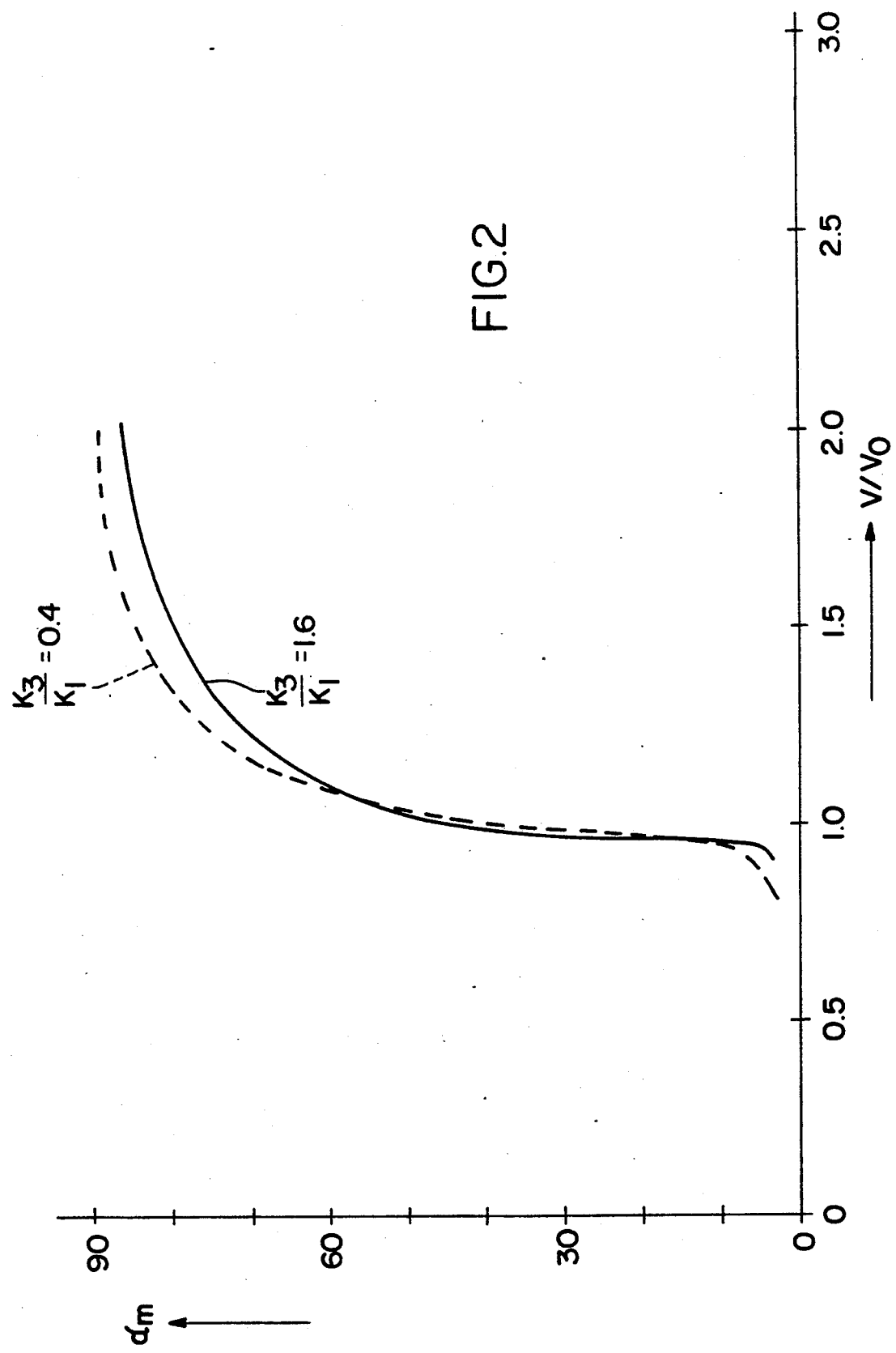

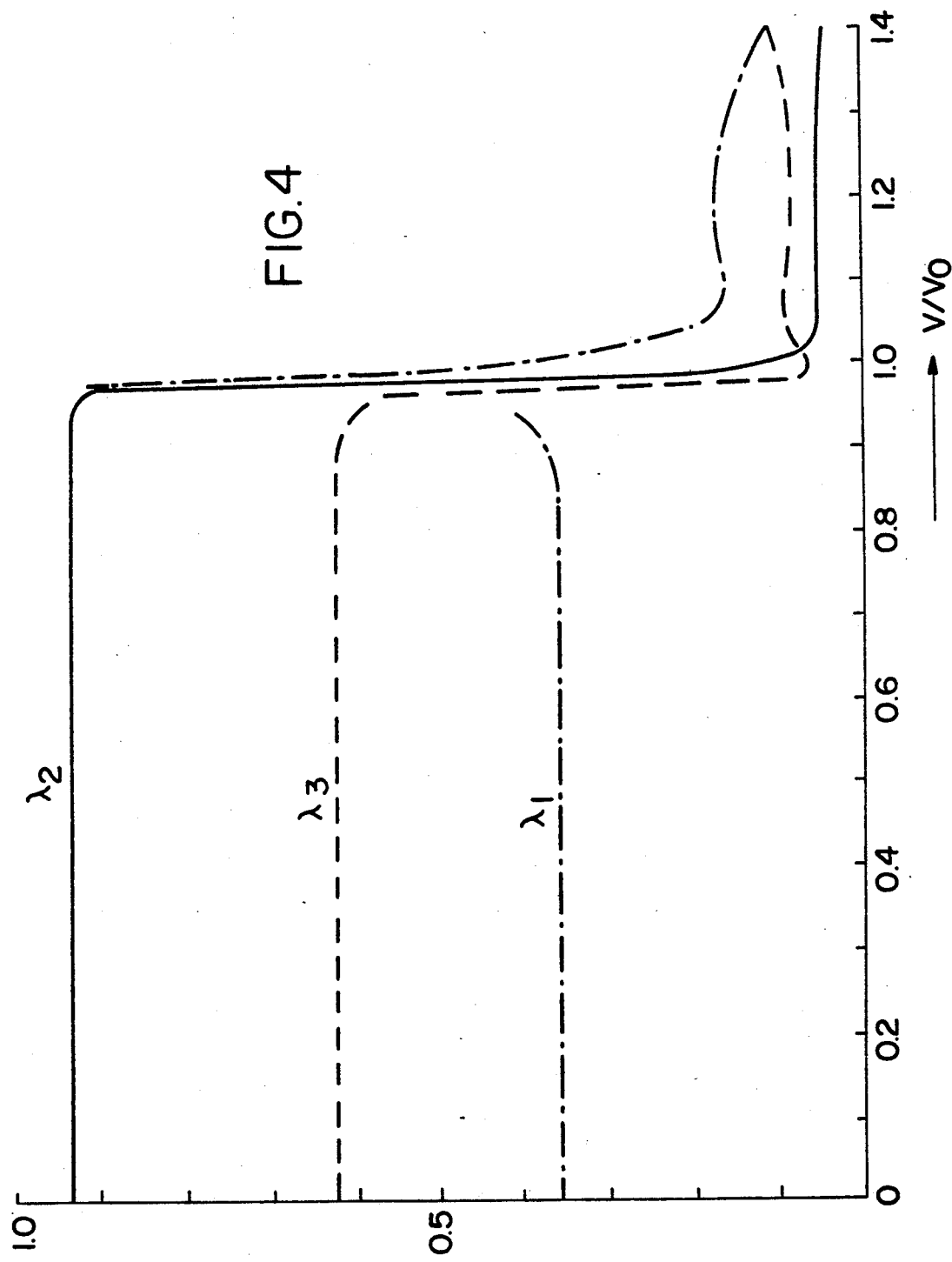

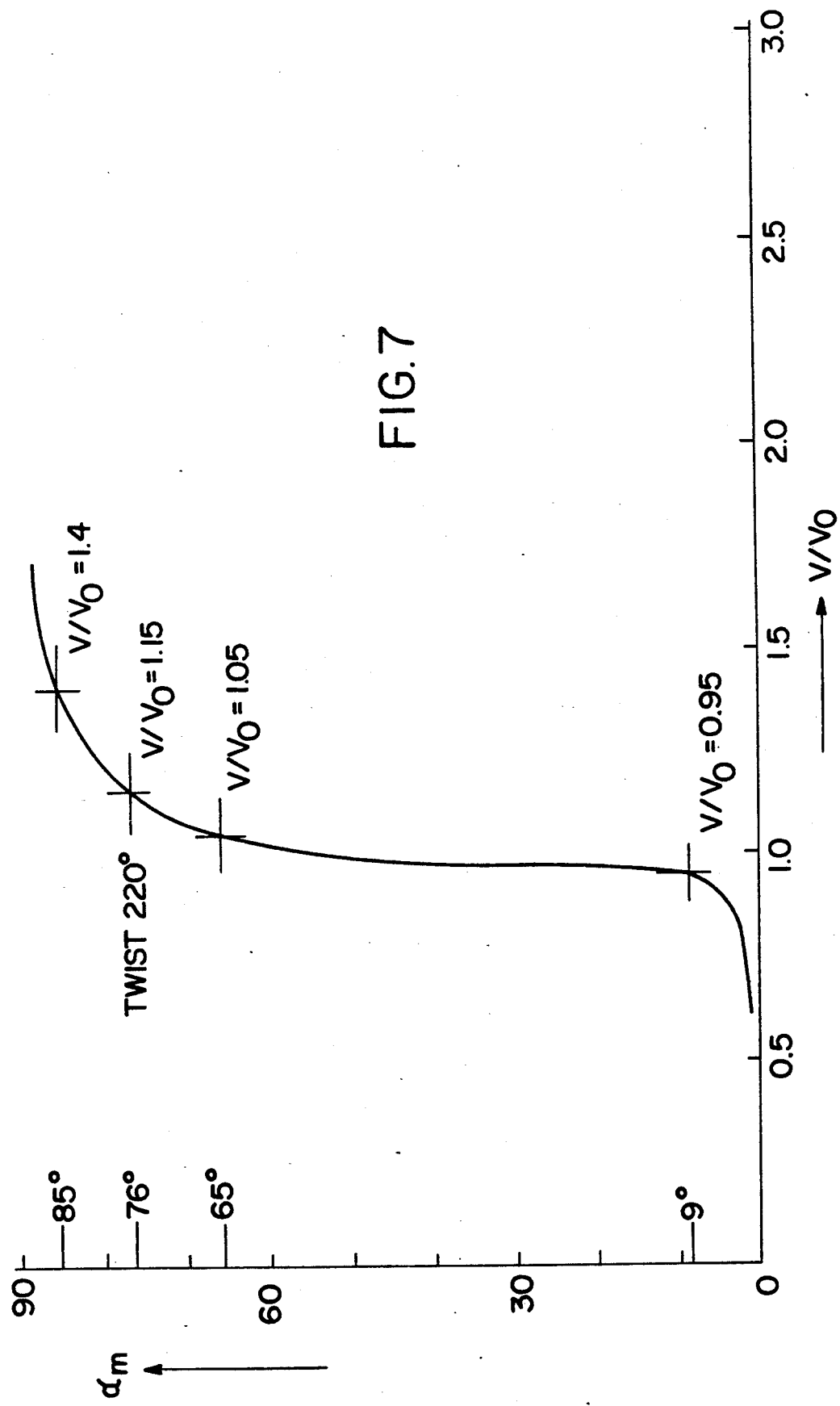

ELECTROOPTICAL DISPLAY ELEMENT USING A SUPERTWIST LIQUID CRYSTAL HAVING SPECIFIED ELASTIC CONSTANTS

This application is a continuation-in-part of U.S. Ser. No. 07/257,565 of Oct. 14, 1988, abandoned, which is a divisional of U.S. Ser. No. 7/130,388 of Nov. 17, 1987, now U.S. Pat. No. 4,799,774, which is the national phase of PCT/EP 87/00135 of Mar. 9, 1987, which is based on FRG P 36 09 141.3 of Mar. 19, 1986, all of which are entirely incorporated by reference herein.

The invention relates to an electrooptical display element with a very narrow dependence of the contrast on the viewing angle and a particularly steep electrooptical characteristic line.

The properties of nematic or nematic-cholesteric liquid crystal materials are utilized for liquid crystal display elements for significant modification of their optical properties, such as light transparency, light scattering, birefringence, reflectance or colour, under the influence of electrical fields. Functioning of such display elements is based here, for example, on the phenomenon of dynamic scattering, deformation of aligned phases, the Schadt-Helfrich effect in the twisted cell or the SBE effect.

Amongst these customary types of liquid crystal display elements, display elements with a large surface area, thin construction and a low power consumption and capable of presenting large quantities of information have in particular recently gained increasing importance. Highly informative display elements of this type are required in electronic data processing, office automation—this includes, inter alia, electronic word processing—the video industry and, in the not too distant future, also the car industry.

Because of their properties, liquid crystal displays are predestined for these display systems. Highly informative liquid crystal displays which have a large surface area and use nematic liquid crystals are operated by the so-called time multiplex method. This control results in displays with a good contrast which is independent of the viewing angle only if the electrooptical characteristic line of the display is very steep. Until liquid crystals with an extremely small ratio of the elastic constants for bending and spreading $K_3/K_1$ are available, there are limits to the steepness of the electrooptical characteristic line of a TN cell. As is known, the contrast can be improved by increasing the twist angle, which in the TN cell is 90° (European Published Application 0,098,070; C. M. Waters, E. P. Raynes and V. Brimmel, Mol. Cryst. Liq. Cryst. 123 (1985) 303; German Offenlegungsschrift DE 3,423,993 A1; T. J. Scheffer and J. Nehring, J. Appl. Phys. Lett. 45 (1984) 1021). Whilst the influence of the various liquid crystal parameters on the steepness of the characteristic line and thus on the contrast is known for the TN cell, there is still substantial uncertainty as to the importance of some liquid crystal properties in the case of display elements with a twist angle >90°. The influence of the elastic constants on the contrast of a display element with a higher twist angle is not discussed at all by T. J. Scheffer et al., and is discussed by C. M. Waters et al. only with very greatly simplified assumptions.

There are therefore still considerable difficulties in the practical application of supertwist cells (TN cell with a twist angle >90°, in particular values from 150° to 250°, preferably in accordance with the literature references described above). These include, above all, the realization of a steep electrooptical characteristic line and the associated good contrast, which moreover should as far as possible be independent of the viewing angle.

The invention is based on the object of providing electrooptical display elements with a high twist angle in which the steepest possible electrooptical characteristic line is guaranteed, together with a maximum contrast and a minimum dependence on the viewing angle.

It has now been found that for a large surface tilt angle the ratio $K_3/K_1$ must always be as large as possible in order to achieve the steepest possible characteristic line and therefore optimum contrast. However, large surface tilt angles can be realized only with difficulty or with the aid of extravagant and therefore expensive materials. The only process known from the literature consists in oblique sputtering of the substrate surfaces with $SiO_2$. In contrast, the rubbing of organic coatings employed at present in production lines leads to only a relatively small surface tilt angle. In the case of the twist angle of $3/2\pi$ favoured by C. M. Waters et al. and T. J. Scheffer et al., the surface tilt angle achieved by rubbing of organic coatings leads to the formation of domains and scattering effects. A combination of a twist angle of >90° and a surface tilt angle of not more than 10° appears to be possible in practice.

Surprisingly, it has now been found that a steep characteristic line or a good contrast which is independent of the viewing angle results for small surface tilt angles and twist angles between 150° and 250° exclusively by using a liquid crystal mixture with a suitable combination of material parameters, in particular with suitable ratios of the elastic constants for bending and twisting $K_3/K_2$ or the elastic constants for bending and spreading $K_3/K_1$.

The invention thus relates to an electrooptical display element which can be multiplexed, has two support plates which, with an edging, form a cell containing a nematic liquid crystal material with positive dielectric anisotropy and at least one chiral additive, and has a small surface tilt angle and a twist angle with a value between 150° and 250°, wherein the ratio of the elastic constants for bending and twisting $K_3/K_2$ of the liquid crystal material and the twist angle are such that when using a liquid crystal material with a ratio of the elastic constants $K_3/K_1$ for bending and spreading, which is on the order of the maximum possible the steepness of the characteristic line is improved but the characteristic line is bistable, or when using a liquid crystal material with a ratio of the elastic constants $K_3/K_1$ for bending and spreading being small enough the steepness of the characteristic line is improved but the characteristic line remains stable. The invention furthermore relates to a corresponding supertwist cell.

The invention further relates to a method of improving the contrast effect of an electrooptical display element which can be multiplexed, has two support plates which, with an edging, form a cell containing a nematic liquid crystal material with positive dielectric anisotropy and at least one chiral additive, and has a small surface tilt angle and a twist angle with a value between 150° and 250°, characterized in that the ratio of the elastic constants for bending and twisting $K_3/K_2$ of the liquid crystal material and the twist angle are adjusted so that by using a liquid crystal material with the maximum possible ratio of the elastic constants $K_3/K_1$ for bending and spreading, the steepness of the characteristic line is improved but the characteristic line is bistable, or by using a liquid crystal material with the ratio of the elastic constants $K_3/K_1$ for bending and spreading being small enough the steepness of the characteristic line is improved but the characteristic line remains stable. The invention furthermore relates to a corresponding process for improving the contrast effect of a supertwist cell.

The construction of the liquid crystal display element according to the invention of polarizers, electrode base plates and electrodes with a surface treatment such that the preferred orientations (directors) of the liquid crystal molecules in each case adjacent thereto are twisted from one to the other electrode usually by 150° to 250° relative to one another, corresponds to the customary design for such display elements. The interpretation of the term customary design is wide here and also includes all the changes and modifications of supertwist cells known from the literature, in particular also matrix display elements and the display elements containing additional magnets in accordance with German Offenlegungsschrift 2,748,738. The surface tilt angles on the two support plates can be identical or different. Identical tilt angles are preferred.

An essential difference of the display elements according to the invention in comparison with those previously customary which are based on the twisted nematic cell is, however, the choice of the liquid crystal parameters of the liquid crystal layer. Liquid crystal phases in which the liquid crystal parameters $K_3/K_1$ and $K_3/K_2$ are chosen so that the steepest possible electrooptical characteristic line is guaranteed, together with a maximum contrast and a minimum dependence on the viewing angle, are employed in the display elements according to the invention.

FIG. 1 is a schematic drawing which illustrates the ranges in which $K_3/K_1$ has a decisive influence on the contrast effect of the display element. The ratio $K_3/K_2$ is plotted as a function of the twist angle ($\beta$) of the cell for a surface tilt angle $\alpha_0 = 1°$. The continuous line separates the regions A and B. Whilst on the continuous line and in its immediate vicinity the ratio $K_3/K_1$ has only a marginal influence on the steepness of the characteristic line, the ratio $K_3/K_1$ must be as large as possible in region A where the characteristic line is bistable in order to obtain a steep characteristic line, but on the other hand $K_3/K_1$ must be small enough in region B so that the characteristic line is stable. In view of the avoidance of hysteresis effects, a stable characteristic line of maximum steepness is the ideal solution. The ideal combination of liquid crystal parameters and display parameters is shown by the shaded region in FIG. 1.

The newly discovered influence of $K_3/K_1$ with $K_3/K_2$ constant and a clearly defined twist angle and surface tilt angle of the cell was not to be seen from the prior art. Furthermore, it could not be seen from the published works on supertwist cells that bistability as a rule occurs only over a certain deformation range.

This is illustrated in more detail in FIG. 2. The tilt angle $\alpha_m$ in the middle of the liquid crystal layer is tilted as a function of the effective voltage applied divided by the threshold voltage. The data relate to a twist angle of 160°, a surface tilt angle of 1° and a $K_3/K_2$ of 2. It can be seen from FIG. 2 that for a $K_3/K_1$ of 1.6, bistability occurs over a relatively small deformation range. The definition of bistability is that various $\alpha_m$ values are found for one and the same $V/V_0$, whilst for the stable curve for $K_3/K_1 = 0.4$, there is always clear correlation between $\alpha_m$ and $V/V_0$. For a display element with a twist angle > 90°, the range from 60° to 85° is, however, of decisive importance for $\alpha_m$. It is therefore not the curve for $K_3/K_1 = 1.6$ with its small bistable range but the curve for $K_3/K_1 = 0.4$, which overall is steeper, which leads to better transmission characteristic lines and therefore a better contrast. This is illustrated in the following figures.

FIG. 3 shows the definition of the polarizer positions. FIG. 4 shows the transmission as a function of the voltage for various wavelengths for a twist angle of 220° and a certain polarizer arrangement. It can be seen from FIG. 4 that this display already switches very well between dark and light for 550 nm. At other wavelengths, there is always a residual transmission in the on and off state, so that the display appears coloured under white illumination. FIG. 4 is intended to show that a very steep characteristic line can be realized by a suitable choice of material parameters and display parameters. The curves relate to perpendicular incidence. However, the contrast as a function of the viewing angle is decisive for the quality of a display. This is illustrated in FIG. 5. The transmission is shown in each case as a function of the viewing angle $\theta$ for various $V/V_O$ ratios in a polar coordinate diagram for a twist angle of 220°, a surface tilt angle of 1° and a wavelength of 550 nm, for a observation angle of 45°. The polarizer positions and the material parameters and cell parameters are identical in FIGS. 4 and 5. The contrast is obtained by dividing the transmission values for $V/V_0 = 0.95$ for appropriate $\theta$ angles by the transmission values for the other $V/V_0$ conditions. The observation angles $\theta$ and $\theta$ are defined in FIG. 6. Good contrast values quite evidently require relatively high $V/V_0$ values or, in other words, $\alpha_m$ values between 60° and 85° (compare FIG. 7). FIG. 7 is obtained from particular consideration of only the $\alpha_m$ range from 60° to 85°. Precisely this range, however, is of essential importance for the quality of a display element with a twist angle > 90°.

Liquid crystal dielectrics with material parameters in ranges according to the invention can be prepared from the customary liquid crystal base materials. Numerous such materials are known from the literature. The dielectrics used for the display elements according to the invention in range B of FIG. 1 advantageously contain at least 15, preferably at least 30 and in particular at least 95 per cent by weight of a mixture of at least two, preferably three to 15 and in particular four to ten liquid crystal compounds, each of which contains at least one structural element selected from series I to XI, it also being possible for structural elements I to IV optionally to be substituted, for example by F, Cl, $CH_3$ and/or CN, or to be in the form of the corresponding N-oxides:

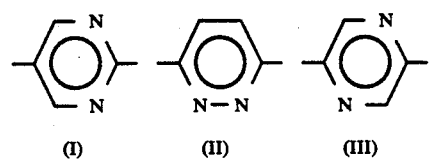

(I)  (II)  (III)

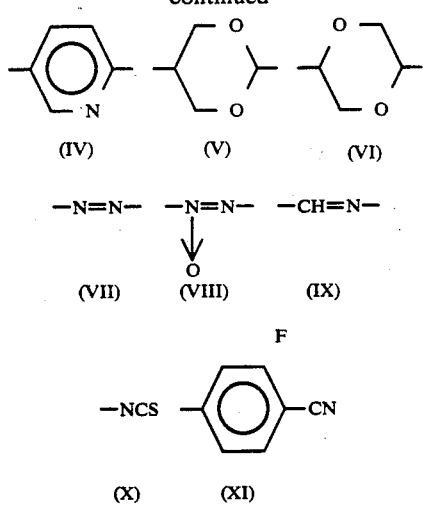

These liquid crystal compounds preferably additionally contain a 1,4-phenylene group.

The proportion of associating compounds is kept as small as possible, in general <30%, preferably <20% and in particular <15%. This is best achieved by using terminally polar components with the structural elements X and/or XI.

The dielectrics used for the display elements according to the invention in range B of FIG. 1 especially preferably contain at least one compound of formula XII.

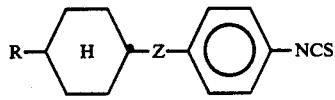

wherein
R is alkyl with 1–15 C-atoms, it also being possible for one or two non-adjacent $CH_2$ groups to be replaced by —O—, —CO—, —O—CO— and/or —CH=CH— and Z is —$CH_2CH_2$— or a single bond.

In particular R is n-alkyl or n-alkoxy with 2–9 C atoms.

The dielectrics used for the display elements according to the invention in range A of FIG. 1 preferably contain the maximum possible proportion of associating compounds. These dielectrics advantageously contain at least 15, preferably at least 30 and in particular at least 60 per cent by weight of a mixture of at least two, preferably three to 15 liquid crystal compounds, each of which contains at least one structural element selected from the series XIII to XV:

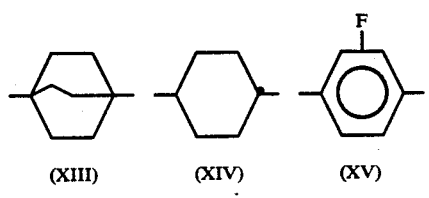

These liquid crystal compounds preferably additionally contain a 1,4-phenylene group.

The dielectrics used for the display elements according to the invention in range A or B preferably contain at least one compound of formula XVI

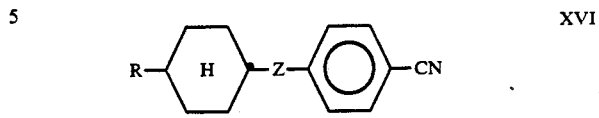

wherein
R is alkyl with 1–15 C atoms, it also being possible for one or two non-adjacent $CH_2$ groups to be replaced by —O13 , —CO—, —O—CO— and/or —CH=CH— and Z is —$CH_2$—$CH_2$— or a single bond.

In particular, R is n-alkyl with 2–7 C atoms and Z is —$CH_2$—$CH_2$—.

Such dielectrics can additionally contain the customary amounts of dyestuffs and/or doping substances if the liquid crystal parameters are not thereby brought out of the ranges according to the invention.

The following examples are intended to illustrate the invention without limiting it. Unless indicated otherwise, percentage data are percentages by weight. All the temperature data are in degrees Celsius.

EXAMPLE 1

A supertwist cell containing a dielectric consisting of
16% of p-trans-4-propylcyclohexylbenzonitrile,
21% of trans-1-p-ethylphenyl-4-propylcyclohexane,
20% of trans-I-p-methoxyphenyl-4-propylcyclohexane,
11% of 4-ethyl-4'-(trans-4-propylcyclohexyl)-biphenyl,
10% of 4-ethyl-4'-(trans-4-pentylcyclohexyl)-biphenyl,
4% of 4,4'-bis-(trans-4-propylcyclohexyl)-biphenyl,
5% of 4,4'-bis-(trans-4-pentylcyclohexyl)-biphenyl,
3% of 4,4'-bis-(trans-4-propylcyclohexyl)-2-fluorobiphenyl,
6% of 4-(trans-4-pentlcyclohexyl)-fluorobiphenyl and
4% of 4-(trans-4-pentylcyclohexyl)-4'-(trans-4-propylcyclohexyl)-fluorbiphenyl shows, at a twist angle of 220°, a steep electrooptical characteristic line and a very low dependence of the contrast on the viewing angle.

EXAMPLE 2

A supertwist cell containing a dielectric consisting of
15% of p-trans-4-propylcyclohexylbenzonitrile,
4% of 3-fluoro-4-cyanophenyl p-ethylbenzoate,
4% of 3-fluoro-4-cyanophenyl p-propylbenzoate,
17% of trans,trans-4-propyloxy-4'-propylcyclohexylcyclohexane,
14% of trans,trans-4-methoxy-4'-pentylcyclohexylcyclohexane,
13% of trans,trans-4-ethoxy-4'-pentylcyclohexylcyclohexane,
5% of trans-4-propylcyclohexyl trans,trans-4-propylcyclohexylcyclohexane-4-carboxylate,
5% of trans-4-pentylcyclohexyl trans,trans-4-propylcyclohexylcyclohexane-4-carboxylate,
5% of trans-4-propylcyclohexyl trans,trans-4-butylcyclohexylcyclohexane-4-carboxylate,
5% of trans-4-pentylcyclohexyl trans,trans-4-butylcclohexlcclohexane-4-carboxylate,
4% 4,4'-bis-(trans-4-propylcyclohexyl)-2-fluorobiphenyl,
4% of 4,4'-bis-(trans-4-pentylcyclohexyl)-2-fluorobiphenyl and 5% of 4-(trans-4-pentylcyclohexyl)-4'-(trans-4-propylcyclohexyl)-2-fluorobiphenyl shows, at a twist angle of 220°, a steep electrooptical characteristic line and a very low dependence of the contrast on the viewing angle.

EXAMPLE 3

A supertwist cell containing a dielectric consisting of
5% of 3-fluoro-4-cyanophenyl p-ethylbenzoate,
5% of 3-fluoro-4-cyanophenyl p-propylbenzoate,
9% of trans-1-p-propylphenyl-4-pentylcyclohexane,
21% of trans-1-p-methoxyphenyl-4-propylcyclohexane,
14% of 4-ethyl-4'-(trans-4-propylcyclohexyl)-biphenyl,
12% of 4-ethyl-4'-(trans-4-pentylcyclohexyl)-biphenyl,
11% of 4 % of 4,4'-bis-(trans-4-propylcyclohexyl)-biphenyl,
4% of 4,4'-bis-(trans-4-propylcyclohexyl)-biphenyl,
4% of 4,4'-bis-(trans-4-pentylcyclohexyl)-2-fluorobiphenyl
5% of 4,4'-bis-(trans-4-pentlcclohexl)-2-fluorobipheny
5% of 4-(trans-4-pentylcyclohexyl)-4'-(trans-4-propylcyclohexyl-biphenyl and
5% of 4-(trans-4-pentylcyclohexyl)-4'-(trans-4-propylcyclohexyl)-2-fluorobiphenyl shows, at a twist angle of 220°, a steep electrooptical characteristic line and a very low dependence of the contrast on the viewing angle.

EXAMPLE 4

A supertwist cell containing a dielectric consisting of
8% of p-trans-4-propylcyclohexylbenzonitrile,
4% of 4-ethyl-4'-cyanobiphenyl,
13% of trans-1-p-ethylphenyl-4-propylcyclohexane,
18% of trans-1-p-methoxyphenyl-4-propylcyclohexane,
9% of trans-1-p-ethoxyphenyl-4-propylcyclohexane,
10% of 4-ethyl-4'-(trans-4-propylcyclohexyl)-biphenyl,
10% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-pentylcyclohexyl)-biphenyl,
4% of 4,4'-bis-(trans-4-pentylcyclohexyl)-2-fluorobiphenyl,
4% of 4,4'-bis-(trans-4-propylcyclohexyl)-2-fluorobiphenyl,
6% of 4-(trans-4-pentylcyclohexyl)-4'-(trans-4-propylcyclohexyl)-biphenyl and
6% of 4-(trans-4-pentylcyclohexyl)-4'-(trans-4-propylcyclohexyl)-2-fluorobiphenyl shows, at a twist angle of 220°, a steep electrooptical characteristic line and a very low dependence of the contrast on the viewing angle.

EXAMPLE 5

A supertwist cell containing a dielectric consisting of
10% of p-trans-4-ethylcyclohexylbenzonitrile,
17% of p-trans-4-propylcyclohexylbenzonitrile,
9% of 2-p-cyanophenyl-5-propyl-1,3-dioxane,
6% of 2-p-cyanophenyl-5-butyl-1,3-dioxane,
5% % of 3-fluoro-4-cyanophenyl p-ethylbenzoate,
7% of 3-fluoro-4-cyanophenyl p-propylbenzoate,
4% of 4-cyanophenyl p-trans-4-ethylcyclohexylbenzoate,
4% of 4-cyanophenyl p-trans-4-pentylcyclohexylbenzoate,
14% of trans,trans-4'-propyloxy-4-propylcyclohexylcyclohexane,
4% of 4-ethyl-4'-(trans-4-propylcyclohexyl)-biphenyl,
3% of 4-ethyl-4'-(trans-4-pentylcyclohexyl)-biphenyl,
4% of 4,4'-bis-(trans-4-propylcyclohexyl)-biphenyl,
4% of 4,4'-bis-(trans-4-propylcyclohexyl)-2-fluorobiphenyl,
5% of 4-(trans-4-pentylcyclohexyl)-4'-(trans-4-propylcyclohexyl)-biphenyl and
4% of 4-(trans-4-pentylcyclohexyl)-4'-(trans-4-propylcyclohexyl)-2-fluorobiphenyl shows, at a twist angle of 160°, a steep electrooptical characteristic line and a very low dependence of the contrast on the viewing angle.

EXAMPLE 6

A supertwist cell containing a dielectric consisting of
5% of p-trans-4-ethylcyclohexyl-benzonitrile,
12% of p-trans-4-propylcyclohexyl-benzonitrile,
8% of p-trans-4-butylcyclohexyl-benzonitrile,
10% of p-trans-4-pentylcyclohexyl-benzonitrile,
3% of 4-ethyl-4'-cyanobiphenyl,
6% of 3-fluoro-4-cyanophenyl p-ethylbenzoate,
8% of 3-fluoro-4-cyanophenyl p-propylbenzoate,
5% of 4-cyano-4'-(trans-4-pentylcyclohexyl)-biphenyl,
11% of 4-ethyl-4'-(trans-4-propylcyclohexyl)-biphenyl,
9% of 4-ethyl-4'-(trans-4-pentylcyclohexyl)-biphenyl,
9% of trans-1-p-ethoxyphenyl-4-propylcyclohexane,
3% of 4,4'-bis-(trans-4-propylcyclohexyl)-biphenyl,
3% of 4,4'-bis-(trans-4-propylcyclohexyl)-2-fluorobiphenyl,
4% of 4-(trans-4-pentylcyclohexyl)-4'-(trans-4-propylcyclohexyl)-biphenyl and
4% of 4-(trans-4-pentylcyclohexyl)-4'-(trans-4-propylcyclohexyl)-2-fluorobiphenyl shows, at a twist angle of 160°, a steep electrooptical characteristic line and a very low dependence of the contrast on the viewing angle.

EXAMPLE 7

A supertwist cell containing a dielectric consisting of
22% of p-trans-4-propylcyclohexylbenzonitrile,
19% of p-trans-4-butylcyclohexylbenzonitrile,
30% of p-trans-4-pentylcyclohexylbenzonitrile,
15% of 4-cyano-4'-(trans-4-pentylcyclohexyl)-biphenyl and
14% of 4-p-cyanophenyl-4'-pentylbiphenyl shows, at a twist angle of 220°, a steep electrooptical characteristic line and a very low dependence of the contrast on the viewing angle.

Examples 1 to 6 relate to region B and Example 7 to region A in FIG. 1.

EXAMPLE 8

A supertwist cell containing a dielectric consisting of
16% of 1-(trans-4-propylcyclohexyl)-2-(4-cyanophenyl)-ethane
21% of trans-1-(p-ethylphenyl)-4-propylcyclohexane
20% of trans 1-(p-methoxyphenyl)-4-propylcyclohexane
11% of 4-(trans-4-propylcyclohexyl)-4'-ethylbiphenyl
10% of 4-(trans-4-pentylcyclohexyl)-4'-pentylbiphenyl
4% of 4-(trans-4-propylcyclohexyl)-4'-(trans-4-propylcyclohexyl)-biphenyl
5% of 4-(trans-4-pentylcyclohexyl)-4'-(trans-4-pentylcyclohexyl)-biphenyl
3% of 2-fluoro-4-(trans-4-propylcyclohexyl)-4'-(trans4-propylcyclohexyl)-biphenyl
4% of 2-fluoro-4-(trans-4-pentylcyclohexyl)-4'-(trans-4-propylcyclohexyl)-biphenyl
6% of 4-(trans-4-pentylcyclohexyl)-4'-(trans-4-propylcyclohexyl)-biphenyl shows, at a twist angle of 220°, a steep electrooptical characteristic line and a very low dependence of the contrast on the viewing angle. Example 8 refers to region B in FIG. 1.

EXAMPLE 9

A supertwist cell containing a dielectric consisting of
10% of p-(trans-4-propylcyclohexyl)-benzonitrile
11% of 1-(trans-4-propyloycloheyxl)-2-(4-cyanophenyl)-ethane
8% of 1-(trans-4-pentylcyclohexyl)-2-(4-cyanophenyl)-ethane
13% of trans-1-(trans-4-propylcyclohexyl)-4-propoxycyclohexane
11% of trans-1-(trans-4-pentylcyclohexyl)-4-methoxycyclohexane
10% of trans-1-(trans-4-pentylcyclohexyl)-4-ethoxycyclohexane
7% of trans-1-(trans-4-propylcyclohexyl)-4-(4-ethylphenyl)cyclohexane
7% of trans-1-(trans-4-propylcyclohexyl)-4-(4-propylphenyl)cyclohexane
7% of trans-1-(trans-4-propylcyclohexyl)-4-(4-fluorophenyl)cyclohexane
7of trans-1-(trans-4-propylcyclohexyl)-4-(3,4-difluorophenyl)cyclohexane
3% of 2-fluoro-4-(trans-4-propylcyclohexyl)-4'-(trans-4-propylcyclohexyl)-biphenyl
3% of 2-fluoro-4-(trans-4-pentylcyclohexyl)-4'-(trans-4-pentylcyclohexyl)-biphenyl
3% of 2-fluoro-4-(trans-4-pentylcyclohexyl)-4-'-(trans-4-propylcyclohexyl)-biphenyl
shows, at a twist angle of 200°, a steep electrooptical characteristic line and a very low dependence of the contrast on the viewing angle. Example 9 relates to region B in FIG. 1.

EXAMPLE 10

A supertwist cell containing a dielectric consisting of
9% of p-(trans-4-propylcyclohexyl)-benzonitrile
10% of 1-(tans-4-propylcyclohexyl)-2-(4-cyanophenyl)-ethane
8% of 1-(trans-4-butylcyclohexyl)-2-(4-cyanophenyl)-ethane
8% of 1-(trans-4-pentylcyclohexyl)-2-(4-cyanophenyl)-ethane
8% of 4-pentyl-4'-cyanobiphenyl
3% of 3-fluoro-4-cyanophenyl 4-ethylbenzoate
5% of 3-fluoro-4-cyanophenyl 4-propylbenzoate
5% of 4-(trans-4-pentylcyclohexyl)-4'-cyanobiphenyl
10% of 4-(trans-4-propylcyclohexyl)-4'-ethylbiphenyl
9% of 4-(trans-4-pentylcyclohexyl)-4'-ethylbiphenyl
11% of trans-1-(p-methoxyphenyl)-4-propylcyclohexane
3% of 4-(trans-4-propylcyclohexyl)-4'-(trans-4-propylcyclohexyl)-biphenyl
4% of 4-(trans-4-pentylcyclohexyl)-4'-(trans-4-propylcyclohexyl)-biphenyl
3% of 2-fluoro-4-(trans-4-propylcyclohexyl)-4'-(trans-4-propylcyclohexyl)-biphenyl
4% of 2-fluoro-4-(trans-4-pentylcyclohexyl)-4'-(trans-4-propylcyclohexyl)-biphenyl
shows, at a twist angle of 180°, a steep electrooptical characteristic line and a very low dependence of the contrast on the viewing angle. Example 10 relates to region B in FIG. 1.

EXAMPLE 11

A supertwist cell containing a dielectric consisting of
21% of p-(trans-4-propylcyclohexyl)-benzonitrile
15% of 1-(trans-4-propylcyclohexyl)-2-(4-cyanophenyl)-ethane
12% of 1-(trans-4-butylcyclohexyl)-2-(4-cyanophenyl)-ethane
12% of 1-(trans-4-pentylcyclohexyl)-2-(4-cyanophenyl)-ethane
5% of 4-pentyl-4''-cyanoterphenyl
10% of 4-(trans-4-pentylcyclohexyl)-4'-cyanobiphenyl
10% of trans-1-(trans-4-propylcyclohexyl)-4-(4-cyanophenyl)-cyclohexane
10% of trans-1-(trans-4-propylcyclohexyl)-4-(3,4-difluorophenyl)-cyclohexane
5% of trans-1-(trans-4-propylcyclohexyl)-4-(3-fluoro4-cyanophenyl)-cyclohexane
shows, at a twist angle of 240°, a steep electrooptical characteristic line and a very low dependence of the contrast on the viewing angle. Example 11 relates to region A in FIG. 1.

EXAMPLE 12

A supertwist cell containing a dielectric consisting of
15% of 1-(trans-4-propylcyclohexyl)-4-isothiocyanatobenzene
10% of p-(trans-4-propylcyclohexyl)-benzonitrile
5% of 4-propyl-4'-butyl-tolane
5% of 4-propyl-4'-pentyl-tolane
5% of 4-butyl-4'-pentyl-tolane
5% of 2-(4-ethylphenyl)-5-propylpyrimidine
5% of 2-(4-propylphenyl)-5-propylpyrimidine
5% of 2-(4-ethylphenyl)-5-heptylpyrimidine
7% of 1-(trans-4-(trans-4-propylcyclohexyl)-cyclohexyl)-2-(4-methylphenyl)-ethane
7% of 1-(trans-4-(trans-4-propylcyclohexyl)-cyclohexyl)-2-(4-ethylphenyl)-ethane
7% of 1-(trans-4-(trans-4-propylcyclohexyl)-cyclohexyl)-2-(4-propylphenyl)-ethane
7of 1-(trans-4-(trans-4-propylcyclohexyl)-cyclohexyl)-2-(4-pentylphenyl)-ethane
8% of 1-(trans-4-(trans-4-propylcyclohexyl)-cyclohexyl)-2-(4-fluorophenyl)-ethane
9% of 1-(trans-4-(trans-4-propylcyclohexyl)-cyclohexyl)-2-(4-cyanophenyl)-ethane
which has a clearing point of 80° C., a birefringence of 0.151 (20° C., 589 nm), $\Delta\epsilon$ of 6.1 (20° C., 1 KHz), $\alpha\Delta\epsilon/\epsilon\perp$ of 2.03 a ratio of bend/twist elastic constants $K_3/K_2$ of 2.3, and a ratio of bend/splay elastic constants $K_3/K_1$ of 1.02, shows, at twist angle of 240°, a steep electrooptical characteristic line and a very low dependence of the contrast on the viewing angle. Example 12 relates to region B in FIG. 1. FIG. 8 (a) depicts the tilt angle in the middle of the liquid crystal layer $\alpha_m$ as a function of the applied voltage for a twist angle $\beta=240°$, and a surface tilt angle $\alpha_0=3°$. FIG. 8 (b) depicts the resulting electrooptical characteristic line for a polarizer angle $\psi=-40°$ and an analyzer angle $\psi'=10°$. Cell thickness d=5.52 μm.

EXAMPLE 13

A supertwist cell containing a dielectric consisting of
22% of p-(trans-4-propylcyclohexyl)-benzonitrile
10% of p-(trans-4-butylcyclohexyl)-benzonitrile
12% of p-(trans-4-pentylcyclohexyl)-benzonitrile
8% of 2,3-difluoro-4-ethoxy-phenyl trans-4-propylcyclohexylcarboxylate
8% of 2,3-difluoro-4-ethoxy-phenyl trans-4-butylcyclohexylcarboxylate
7% of 2,3-difluoro-4-ethoxy-phenyl trans-4-pentylcyclohexylcarboxylate 5% of 4-methyl-4'-ethoxy-tolane
6% of 4-ethyl-4'-methoxy-tolane
6% of 4-(trans-4-propylcyclohexyl)-4'-methoxytolane
5% of 4-(trans-4-propylcyclohexyl)-4'-ethoxytolane
6% of 4-(trans-4-propylcyclohexyl)-4'-propoxytolane
5% of 4-(trans-4-propylcyclohexyl)-4'-(trans-4-propylcyclohexyl)-biphenyl which has a clearing point of 86 °C., a birefringence of 0.164, a $\Delta\epsilon$ of 7.9, a $\Delta\epsilon/\Delta\bot$ of 1.32, a $K_3/K_2$ of 2.8 and a $K_3/K_1$ of 1.53, shows at a twist angle of 240°, a steep electrooptical characteristic line and a very low dependence of the contrast on the viewing angle. Example 13 relates to region A of FIG. 1. FIG. 9 depicts that the resulting midplane tilt angle $\alpha_m$ versus voltage curve is bistable. Cell thickness d=5.04 μm, surface tilt angle $\alpha_0$=3°.

EXAMPLE 14

A supertwist cell containing a dielectric consisting of
22% of 1-(trans-4-propylcyclohexyl)-2-(4-cyanophenyl)-ethane
10% of 1-(trans-4-butylcyclohexyl)-2-(4-cyanophenyl)-ethane
12% of 1-(trans-4-pentylcyclohexyl)-2-(4-cyanophenyl)-ethane
8% of 2,3-difluoro-4-ethoxyphenyl trans-4-propylcyclohexyl-carboxylate
8% of 2,3-difluoro-4-ethoxyphenyl trans-4-butylcyclohexyl-carboxylate
7% of 2,3-difluoro-4-ethoxyphenyl trans-4-pentylcyclohexyl-carboxylate
5% of 4-methyl-4'-ethoxy-tolane
6% of 4-ethyl-4'-methoxy-tolane
6% of 4-(trans-4-propylcyclohexyl)-4'-methoxytolane
5% of 4-(trans-4-propylcyclohexyl)-4'-ethoxytolane
6% of 4-(trans-4-propylcyclohexyl)-4'-propoxytolane
5% of 4-(trans-4-propylcyclohexyl)-4'-(trans-4-propylcyclohexyl)-biphenyl shows, at a twist angle of 240° and a surface tilt angle $\alpha_0$=3°, a steep electrooptical characteristic line and a very low dependence of the contrast on the viewing angle. Example 14 relates to region A of FIG. 1.

The bistability is demonstrated by FIG. 10, giving the midplane tilt angle $\alpha_m$ as a function of the applied voltage.

EXAMPLE 15

A supertwist cell containing a dielectric consisting of
22% of p-(trans-4-propylcyclohexyl)-benzonitrile
10% of p-(trans-4-butylcyclohexyl)-benzonitrile
12% of p-(trans-4-pentylcyclohexyl)-benzonitrile
12% of trans-1-(4-ethoxyphenyl)-4-propylcyclohexane
11% of trans-1-(4-methoxyphenyl)-4-pentylcyclohexane
5% of 4-methyl-4'-ethoxy-tolane
6% of 4-ethyl-4-methoxy-tolane
6% of 4-(trans-4-propylcyclohexyl)-4'-methoxytolane
5% of 4-(trans-4-propylcyclohexyl)-4'-ethoxytolane
6% of 4-(trans-4-propylcyclohexyl)-4'-propoxytolane
5% of 1,4-bis-(trans-4-propycyclohexyl)-benzene which has a clearing point of 81°, birefringence of 0.161, $\Delta\epsilon$ of +8.3, a $\Delta\epsilon/\epsilon\bot$ of 1.98, a $K_3/K_2$ of 2.8, a $K_3/K_1$ of 1.48, shows at a twist angle of 220°, a steep electrooptical characteristic line and a very low dependence of the contrast on the viewing angle. Example 15 relates to region B in FIG. 1. FIG. 11 (a) shows the resulting midplane tilt angle $\alpha_m$ as a function of the applied voltage for a twist angle $\beta$=220°, and a surface tilt angle $\alpha_0$=1°. The corresponding electrooptical characteristic line is depicted in FIG. 11 (b) for a polarizer angle $\psi$=−40° and an analyzer angle $\psi'$=−15°. Cell thickness d=5.32 μm.

EXAMPLE 16

A supertwist cell containing a dielectric consisting of
22% of 1-(trans-4-propyl)-2-(4-cyanophenyl)-ethane
10% of 1-(trans-4-butyl)-2-(4-cyanophenyl)-ethane
12% of 1-(trans-4-pentyl)-2-(4-cyanophenyl)-ethane
12% of trans-1-(4-ethoxyphenyl)-4-propylcyclohexane
11% of trans-1-(4-methoxyphenyl)-4-pentylcyclohexane
5% of 4-methyl-4'-ethoxy-tolane
6% of 4-ethyl-4'-methoxy-tolane
6% of 4-(trans-4-propylcyclohexyl)-4'-methoxytolane
5% of 4-(trans-4-propylcyclohexyl)-4'-ethoxytolane
6% of 4-(trans-4-propylcyclohexyl)-4'-propoxytolane
5% of 4,4'-bis-(trans-4-propylcyclohexyl)-biphenyl shows, at a twist angle of 200°, a steep electrooptical characteristic line, and a very low dependence of the contrast on the viewing angle. Example 16 relates to region B in FIG. 1. FIG. 12 (a) and (b) depict corresponding midplane tilt angle $\alpha_m$ and transmission characteristics as a function of the applied voltage.

EXAMPLE 17

A supertwist cell containing a dielectric consisting of
20% of 1-(trans-4-propylcyclohexyl)-2-(4-cyanophenyl)-ethane
10% of 1-(trans-4-butylcyclohexyl)-2-(4-cyanophenyl)-ethane
12% of 1-(trans-4-pentylcyclohexyl)-2-(4-cyanophenyl)-ethane
13% of trans-1-(4-ethoxyphenyl)-4-propylcyclohexane
7% of trans-1-(trans-4-propylcyclohexyl)-4-(4-methylphenyl)-cyclohexane
7% of trans-1-(trans-4-propylcyclohexyl)-4-(4-ethylphenyl)-cyclohexane
7% of trans-1-(trna-4-propylcyclohexyl)-4-(4-propylphenyl)-cyclohexane
7% of trans-1-(trans-4-propylcyclohexyl)-4-(4-pentylphenyl)-cyclohexane
6% of 4-(trans-4-propylcyclohexyl)-4'-methoxy-tolane
5% of 4-(trans-4-propylcyclohexyl)-4'-ethoxy-tolane
6% of 4-(trans-4-propylcyclohexyl)-4'-propoxy-tolane shows, at a twist angle of 220°, a steep electrooptical characteristic line and a very low dependence of the contrast on the viewing angle. Example 17 relates to region B in FIG. 1.

BRIEF DESCRIPTION OF THE FIGURES

FIG. 1: Ratio of the elastic constants for bending ($K_3$) and twisting ($K_2$) $K_3/K_2$ as a function of the total twist ($\beta$) of the cell FIG. 2: Tilt angle in the middle of the cell $\alpha_m$ as a function of the reduced voltage $V/V_0$ Total twist: $\beta$=160°

Alignment angle of the molecules on the substrate surface: $\alpha_0$=1° Ratio of the elastic constants for bending ($K_3$) and twisting ($K_2$): $K_3/K_2$=2.67

Figure 3A:
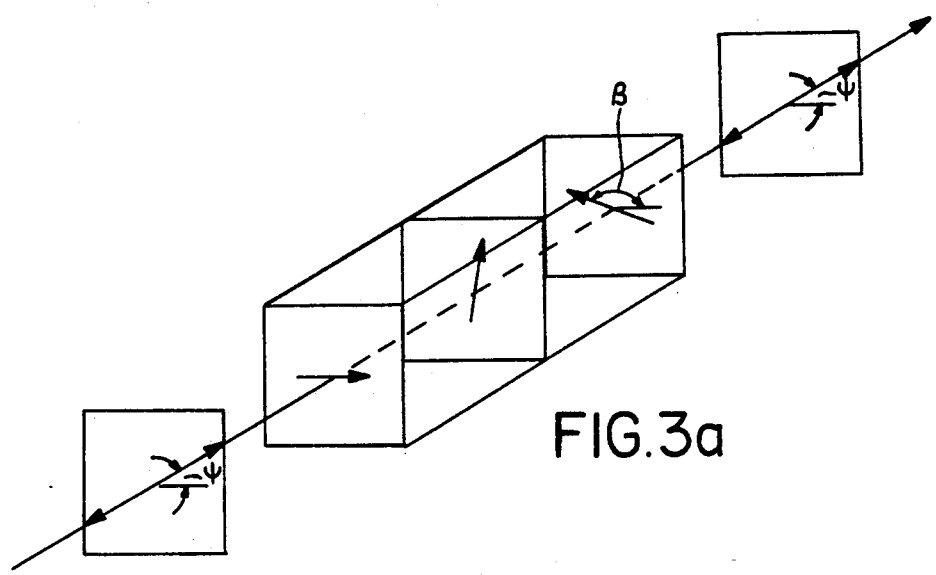
Figure 3B:
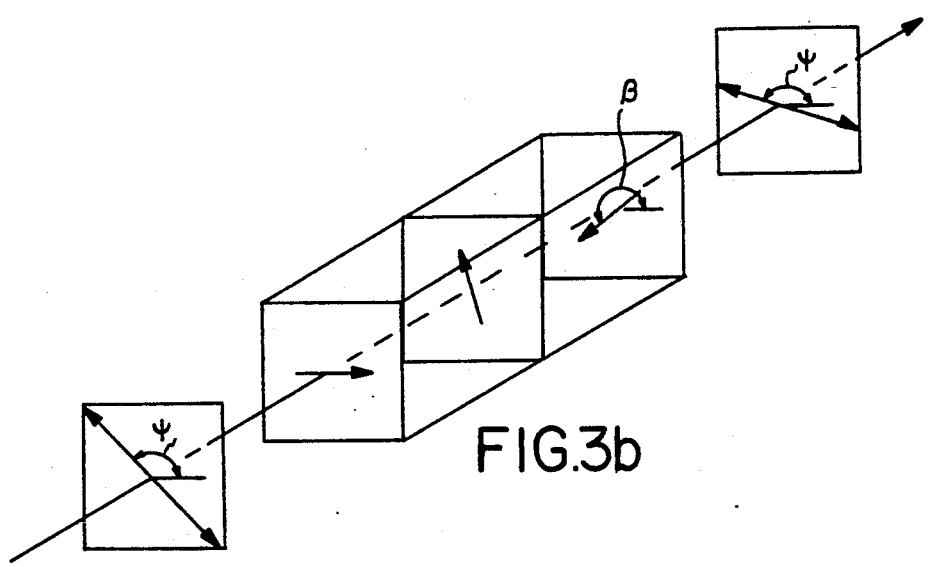

Ratio of the dielectric anisotropy ($\Delta\epsilon$) and the dielectric constants perpendicular to the director ($\epsilon\bot$): $\Delta\epsilon/\epsilon\bot$=0.33 Cell thickness d=8 μm FIGS. 3a & b: Schematic representation of the twisted liquid crystal cell with polarizer and analyzer $\beta$=total twist of the liquid crystal layer $\psi$=angle between the director at the 1st substrate surface and the direction of passage through the polarizer.

Figure 5:
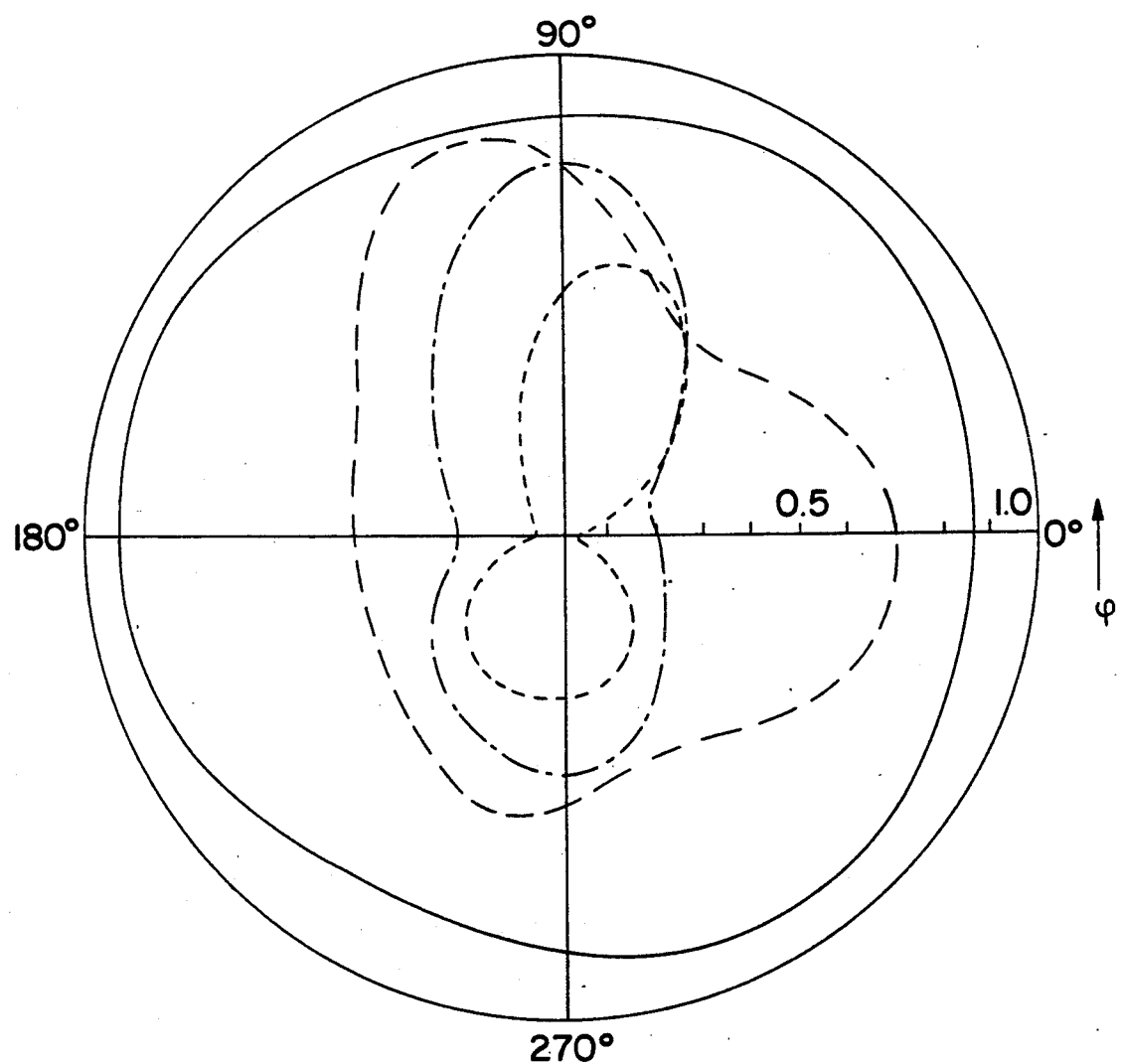
Figure 6:
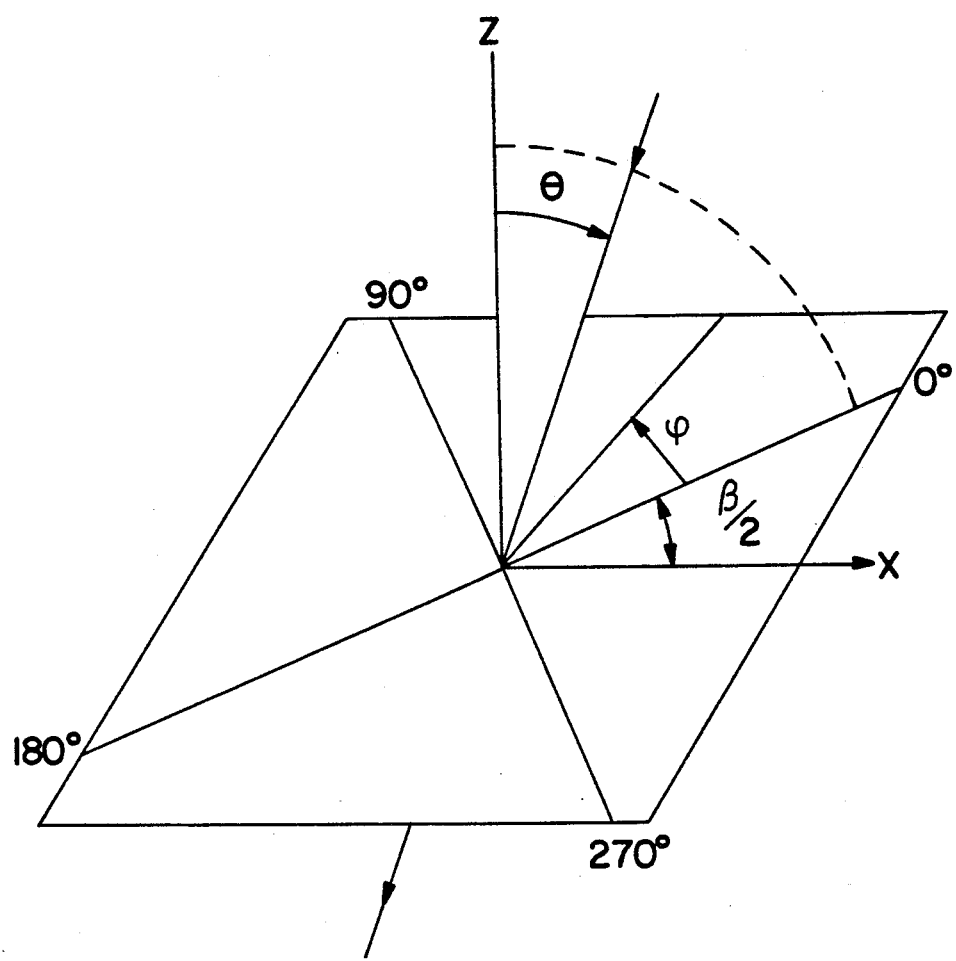

$\psi'$=angle between the director at the first substrate surface and the direction of passage through the analyzer a) $\beta=160°$
b) $\beta=220°$ FIG. 4: Transmission as a function of the reduced voltage $V/V_0$
Cell data:
Total twist: $\beta=220°$
Polarizer: $\psi=-45°$
Analyzer: $\psi'=-15°$
Alignment angle of the molecules on the substrate surface $\alpha_0=1°$
Ratio of the elastic constants for bending ($K_3$) and twisting ($K_2$): $K_3/K_2=2.67$
Ratio of the elastic constants for bending ($K_3$) and spreading: $K_3/K_1=0.4$
Ratio the dielectric anisotropy ($\Delta\epsilon$) and the dielectric constants perpendicular to the director ($\epsilon\perp$): $\Delta\epsilon/\epsilon=0.33$
Cell thickness: $d=8\ \mu m$
Parameter: Wavelength of the incident light $\lambda_1=450$ nm $\lambda_2=550$ nm $\lambda_3=650$ nm FIG. 5: Dependence of the transmission on the angle
Cell data:
Total twist: $\beta=220°$
Polarizer: $\psi=-45°$
Analyzer: $\psi'=-15°$
Alignment angle of the molecules on the substrate surface $\alpha_0=1°$ Ratio of the elastic constants for bending ($K_3$) and twisting ($K_2$): $K_3/K_2=2.67$
Ratio of the elastic constants for bending ($K_3$) and spreading: $K_3/K_1=0.4$
Ratio of the dielectric anisotropy ($\Delta\epsilon$) and the dielectric constants perpendicular to the director ($\epsilon\perp$): $\Delta\epsilon/\epsilon\perp=0.33$
Cell thickness: $d=8\ \mu m$
Parameters: Reduced voltage: $V/V_0=0.95$ — $V/V_0=1.05$ — $V/V_0=1.15$ — $V/V_0=1.4$ FIG. 6: Schematic representation to illustrate the observation angles $\theta$ and $\theta$
x=direction of the director at the first substrate surface
$\beta$=total twist of the cell
$\theta$=angle to the cell perpendicular
$\theta$=azimuth FIG. 7: Tilt angle $\alpha_m$ in the middle of the cell as a function of the reduced voltage $V/V_0$
Total twist: $\beta=220°$
Alignment angle of the molecules on the substrate surface: $\alpha_0=1°$
Ratio of the elastic constants for bending ($K_3$) twisting ($K_2$): $K_3/K_2=2.67$ Ratio of the elastic constants for bending ($K_3$) and spreading ($K_1$) $K_3/K_1=0.4$ Ratio of the dielectric anisotropy ($\Delta\epsilon$) and the dielectric constant perpendicular to the director ($\epsilon\perp$) $\Delta\epsilon/\epsilon\perp=0.33$
Cell thickness $d=8\ \mu m$
The tilt angles $\alpha_m$ for the reduced voltage values $V/V_0$ at which the dependences of the transmission on the angle shown in FIG. 5 have been calculated are plotted.

Figure 8A:
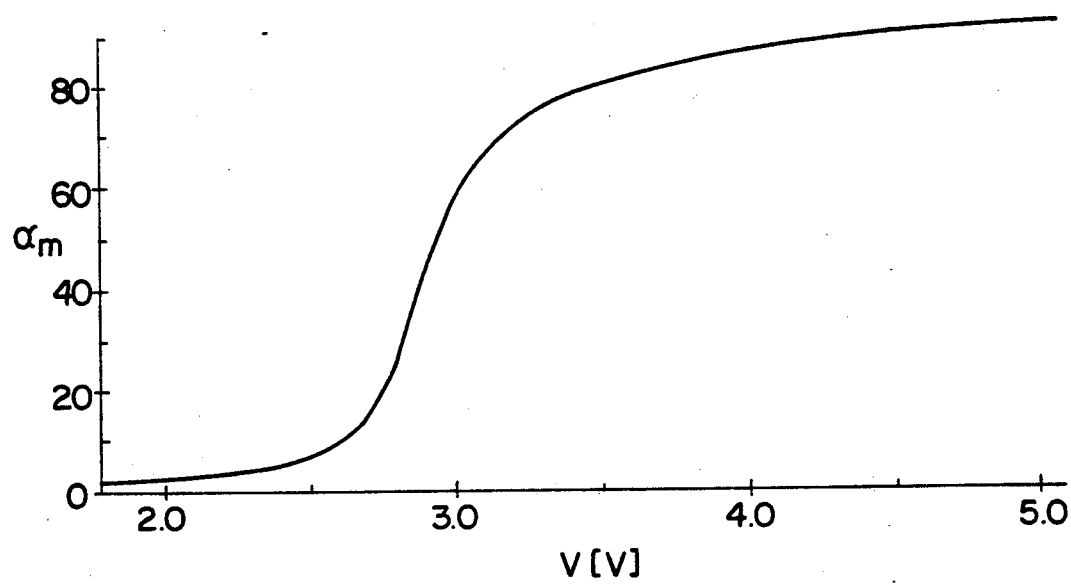
Figure 8B:
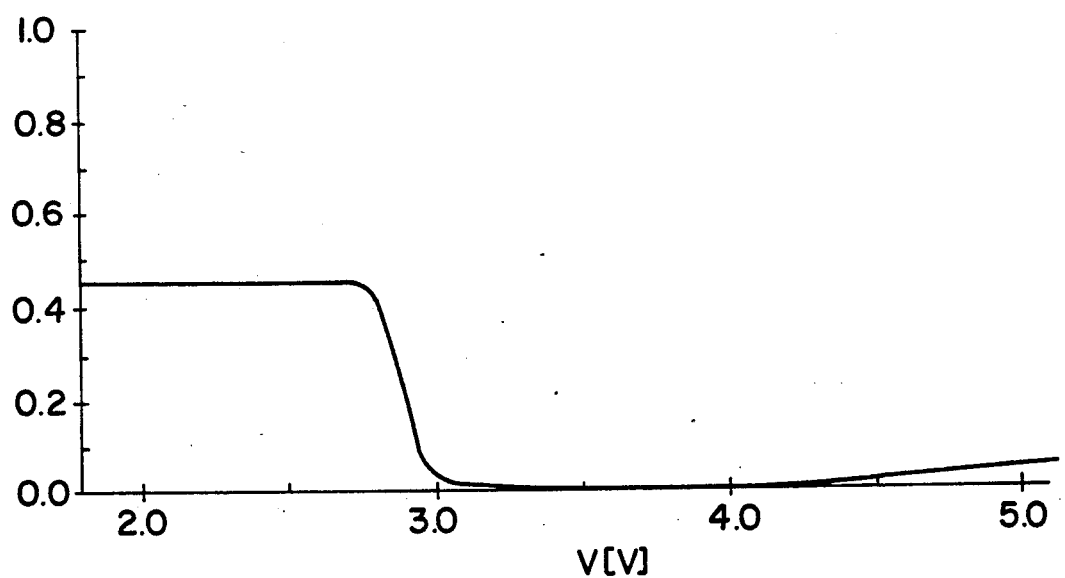

FIG. 8: (a) Tilt angle in the middle of the cell $\alpha_m$ as a function of the voltage V
Total twist: $\beta=240°$
Alignment angle of the molecules on the substrate surface: $\alpha_0=3°$
Ratio of the elastic contants for bending ($K_3$) and twisting ($K_2$): $K_3/K_2=2.3$
Ratio of the elastic constants for bending ($K_3$) and spreading ($K_1$): $K_3/K_1=1.02$
Dielectric anisotropy $\Delta\epsilon=6.1$
Optical anisotropy $\Delta n=0.151$
Clearing point $T_C=80°$ C.
Ratio of the dielectric anisotropy ($\Delta\epsilon$) and the dielectric constant perpendicular to the director ($\epsilon\perp$) $\Delta\epsilon/\Delta\perp=2.03$.
Cell thickness: $d=5.52\ \mu m$.
(b) Transmission as a function of the voltage V
polarizer angle: $\psi=-40°$
analyzer angle: $\psi'=10°$ $$\text{Sharpness:}\quad \gamma_{50}=\frac{V_{50}-V_{10}}{V_{10}}=0.027$$

$$\gamma_{90}=\frac{V_{90}-V_{10}}{V_{10}}=0.061$$

with $V_{10}$, $V_{50}$ and $V_{90}$ being the voltages producing 10%, 50% or 90% transmission.
The other data are the same as in FIG. 8 (a)

Figure 9:
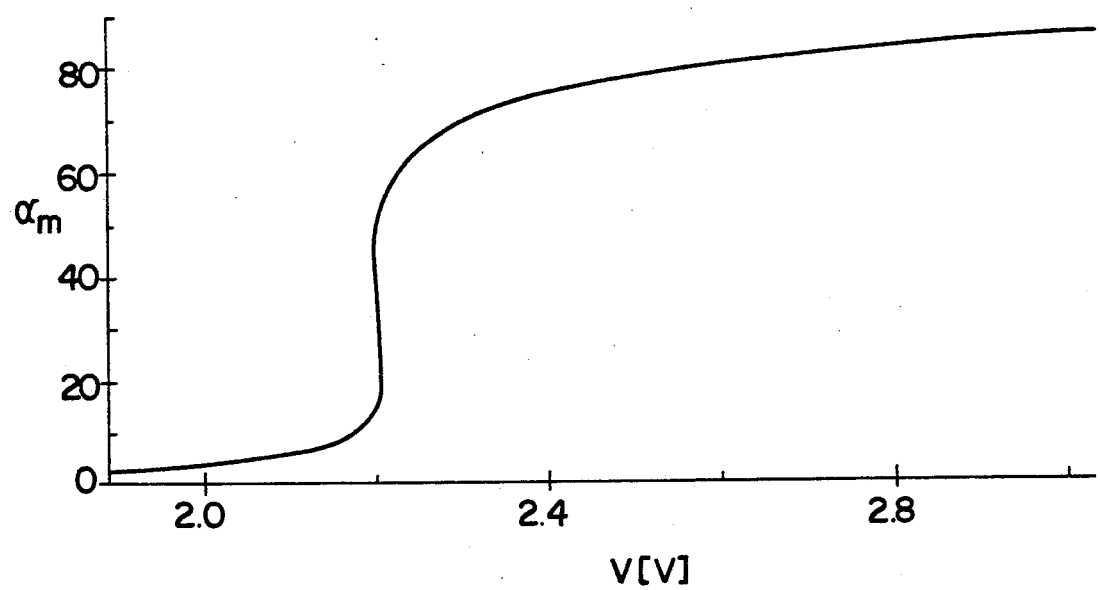
Figure 10:
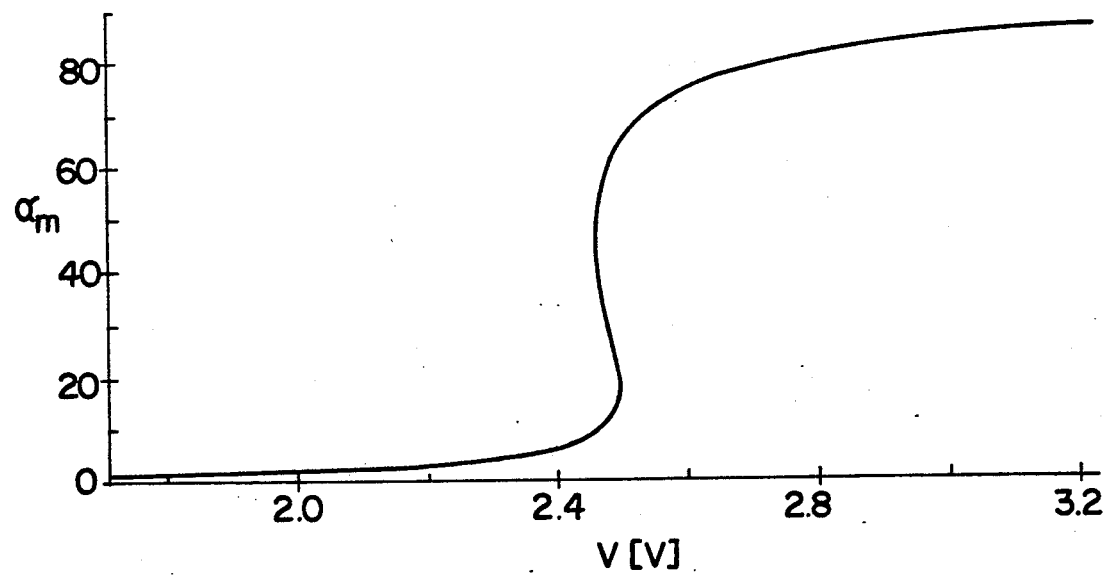

FIG. 9: Tilt angle in the middle of the cell $\alpha_m$ as a function of voltage V
Total twist: $\beta=240°$
Alignment angle of the molecules on the substrate surface: $\alpha_0=3°$
Ratio of the elastic constants for bending ($K_3$) and twisting ($K_2$): $K_3/K_2=2.8$
Ratio of the elastic constants for bending ($K_3$) and spreading ($K_1$): $K_3/K_1=1.53$
Dielectric anisotropy: $\Delta\epsilon=7.9$
Optical anisotropy: $\Delta n=0.164$
Clearing point: $T_C=86°$ C.
Ratio of the dielectric anisotropy ($\Delta\epsilon$) and the dielectric constant perpendicular to the director ($\epsilon\perp$): $\Delta\epsilon/\epsilon\perp=1.32$
Cell thickness: $d=5.04\ \mu m$ FIG. 10: Tilt angle in the middle of the cell $\alpha_m$ as a function of voltage V
Total twist: $\beta=240°$
Alignment angle of the molecules on the substrate surface: $\alpha_0=3°$.

Figure 11A:
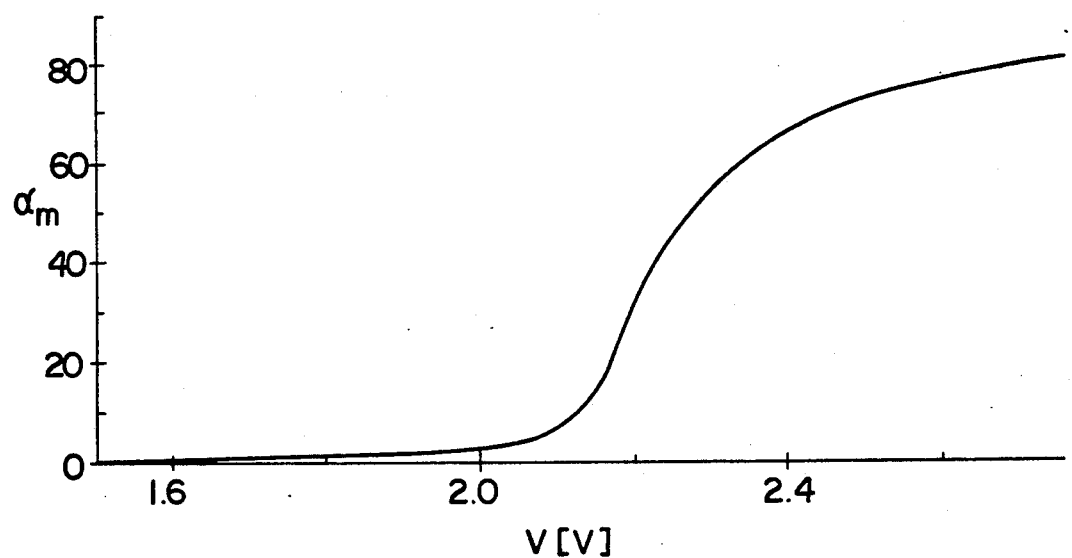
Figure 11B:
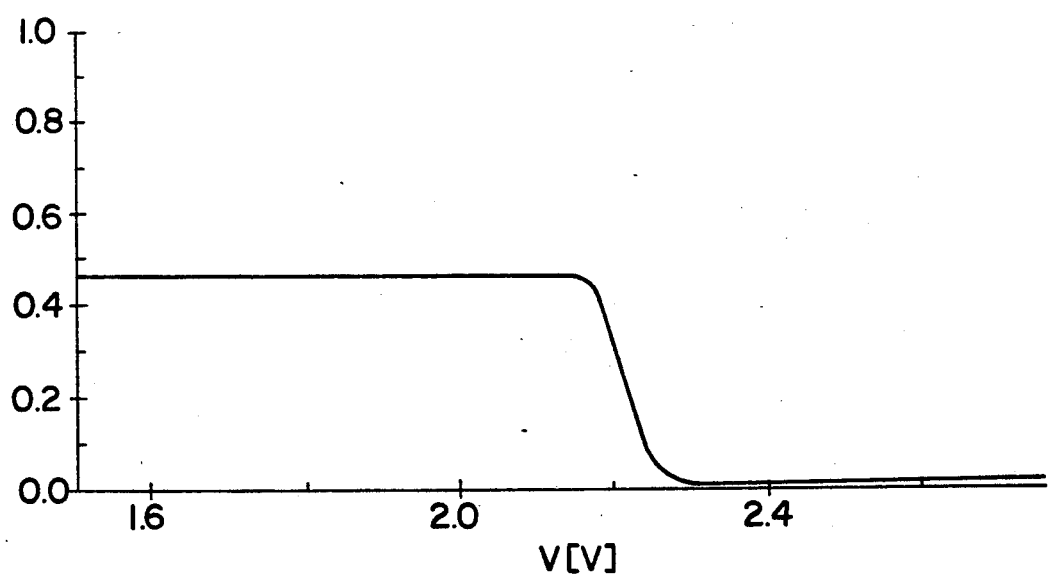
Figure 12A:
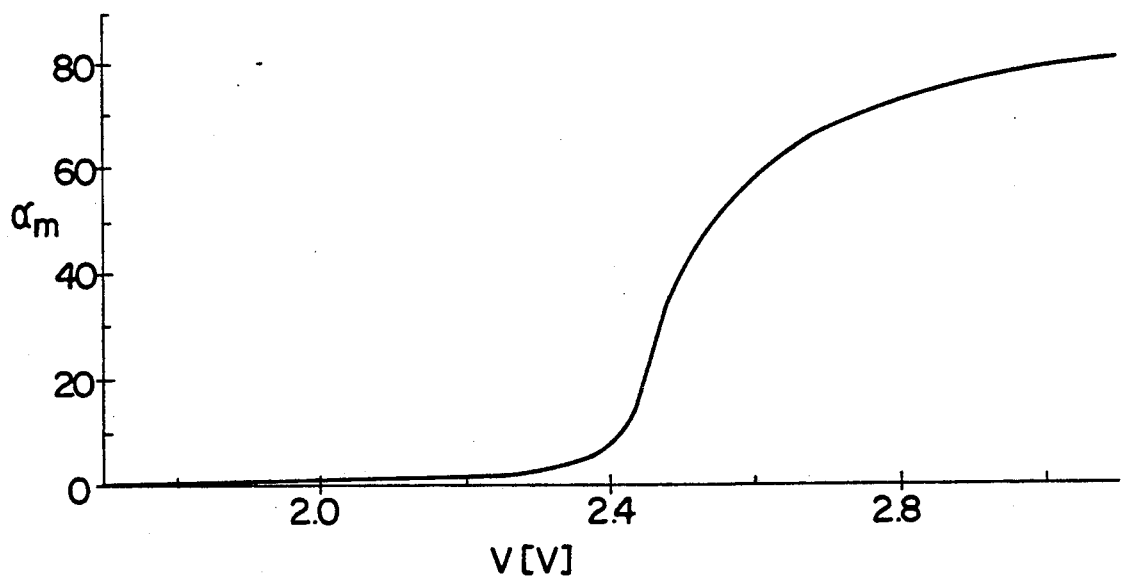
Figure 12B:
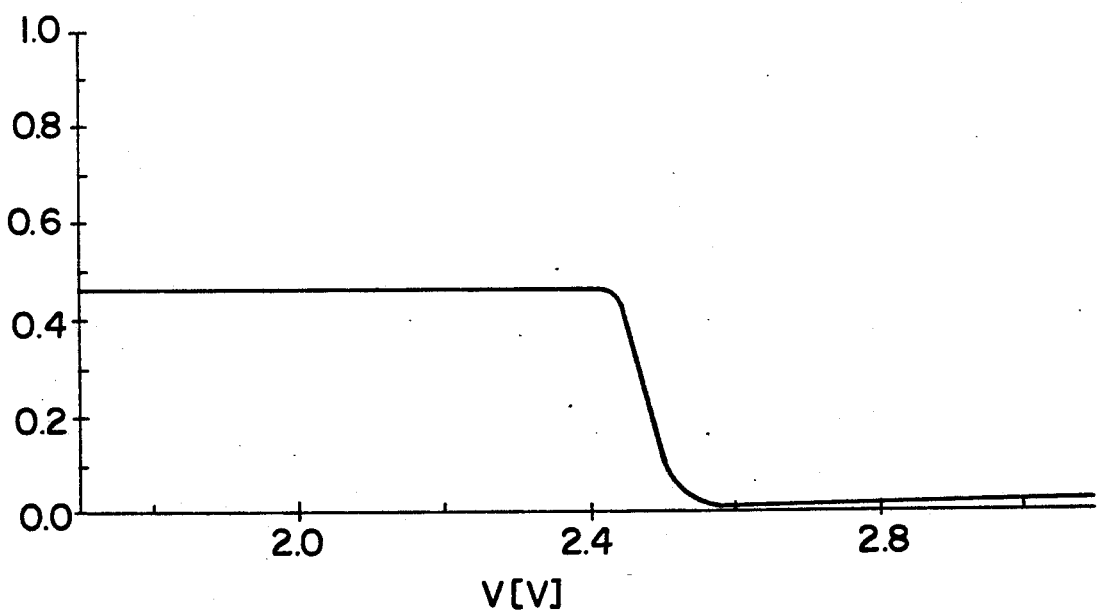

FIG. 11: (a) Tilt angle in the middle of the cell $\alpha_m$ as a function of voltage V
Total twist: $\beta=220°$
Alignment angle of the molecules on the substrate surface: $\alpha_0=1°$
Ratio of the elastic constants for bending ($K_3$) and twisting ($K_2$)=$K_3/K_2=2.8$
Ratio of the elastic constants for bending ($K_3$) and spreading ($K_1$): $K_3/K_1=1.48$
Dielectric anisotropy: $\Delta\epsilon=8.3$
Optical anisotropy: $\Delta n=0.161$
Clearing point: $81°$ C.
Ratio of the dielectric anisotropy ($\Delta\epsilon$) and the dielectric constant perpendicular to the director ($\epsilon\perp$): $\Delta\epsilon/\epsilon\perp=1.98$
Cell thickness: $d=5.32\ \mu m$.
(b) Transmission as a function of the voltage V
polarizer angle: $\psi=-40°$
analyzer angle: $\psi'=-40°$ $$\text{Sharpness:} \quad \gamma_{50} = \frac{V_{50} - V_{10}}{V_{10}} = 0.016$$

$$\gamma_{90} = \frac{V_{90} - V_{10}}{V_{10}} = 0.036$$

with $V_{10}$, $V_{50}$, $V_{90}$ being the voltages producing 10%, 50% or 90% transmission FIG. 12: (a) Tilt angle in the middle of the cell $\alpha_m$ as a function of the voltage V Total twist: 200°

(b) Transmission as a function of the voltage V

We claim:

1. An electrooptical display element which can be multiplexed, has improved contrast effect, has two support plates which, with an edging, form a cell containing a nematic liquid crystal material with positive dielectric anisotropy and at least one chiral additive; has a characteristic line of the transmission of light through the display element as a function of voltage applied across the cell, and has a small surface tilt angle and a twist angle with a value between 150° and 250°, wherein the ratio of the elastic constants for bending and twisting $K_3/K_2$ of the liquid crystal material and the twist angle are such that when using a liquid crystal material with a ratio of the elastic constants $K_3/K_1$ for bending and spreading which is on the order of the maximum possible, the steepness of the characteristic line is improved but the characteristic line is bistable, or when using a liquid crystal material with a ratio of the elastic constants $K_3/K_1$ for bending and spreading being small enough the steepness of the characteristic line is improved but the characteristic line remains stable.

2. A display element of claim 1 which is based on a supertwist cell.

3. A display element of claim 1 wherein the surface tilt angle of at least one support plate is not more than 10°.

4. A display element of claim 1 wherein $K_3/K_1$ is on the order of the maximum possible and the liquid crystalline material is a mixture containing at least two liquid crystal compounds each of which contains at least one structural element of Formulae I to XI

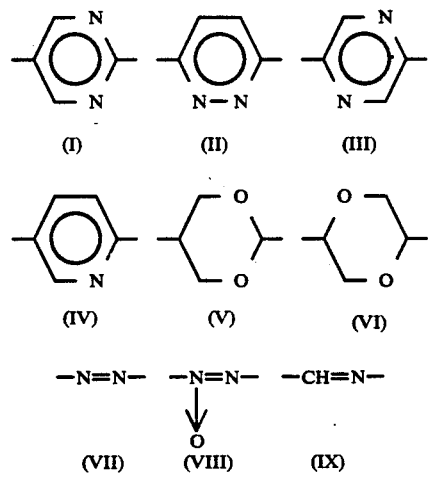

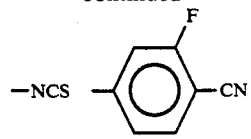

5. A display element of claim 4 wherein the liquid crystalline material contains at least one compound of formula XII

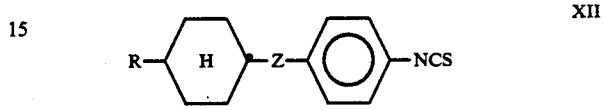

wherein
R is alkyl with 1-15 C atoms, it also being possible for one or two non-adjacent $CH_2$ groups to be replaced by —O—, —CO—, —O—CO— and/or —CH=CH— and
Z is —$CH_2$—$CH_2$— or a single bond.

6. A display element of claim 1 wherein $K_3/K_1$ is small enough so that the steepness of the characteristic line is improved but the characteristic line remains stable and wherein the liquid crystalline material is a mixture containing at least two liquid crystal compounds each of which contains at least one structural element of Formulae XII to XV

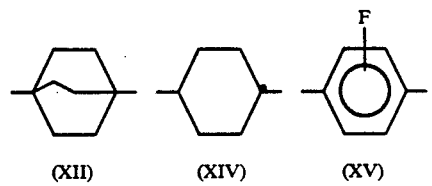

7. A display element of claim 1 wherein the liquid crystalline material contains at least one compound of formula XVI

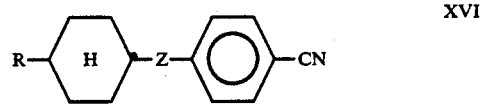

wherein
R is alkyl with 1-15 C atoms, it also being possible for one or two non-adjacent $CH_2$ groups to be replaced by —O—, —CO—, —O—CO— and/or —CH=CH— and
Z is —$CH_2$—$CH_2$— or a single bond.

8. A display element of claim 7 wherein R is n-alkyl with 2-7 C atoms and Z is —$CH_2$—$CH_2$—.

9. A method of improving the contrast effect of an electrooptical display element which can be multiplexed, has two support plates which, with an edging, form a cell containing a nematic liquid crystal material with positive dielectric anisotropy and at least one chiral additive, has a characteristic line of the transmission of light through the display element as a function of voltage applied across the cell, and has a small surface tilt angle and a twist angle with a value between 150° and 250°, characterized in that the ratio of the elastic constants for bending and twisting $K_3/K_2$ of the liquid crystal material and the twist angle are adjusted so that by using a liquid crystal material with the maximum possible ratio of the elastic constants $K_3/K_1$ for bending and spreading, the steepness of the characteristic line is improved but the characteristic line is bistable, and the liquid crystalline material is a mixture containing at least two liquid crystal compounds each of which contains at least one structural element of Formulae I to XI.

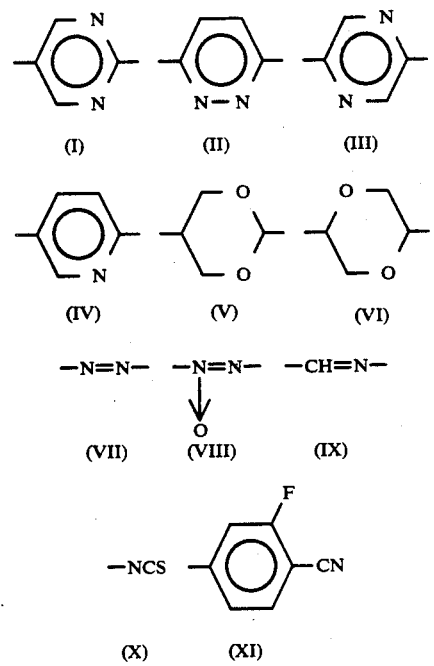

10. The method according to claim 9 for improving the contrast effect of a supertwist cell.

11. The method according to claim 9, characterized in the surface tilt angle of at least one support plate is not more than 10°.

12. A method of improving the contrast effect of an electrooptical display element which can be multiplexed, has two support plates which, with an edging, form a cell containing a nematic liquid crystal material with positive dielectric anisotropy and at least one chiral additive, has a characteristic line of the transmission of light through the display element as a function of voltage applied across the cell, and has a small surface tilt angle and a twist angle with a value between 150° and 250°, characterized in that the ratio of the elastic constants for bending and twisting $K_3/K_2$ of the liquid crystal material and the twist angle are adjusted so that by using a liquid crystal material with the maximum possible ratio of the elastic constants $K_3/K_1$ for bending and spreading, the steepness of the characteristic line is improved but the characteristic line is bistable, and the liquid crystal material is a mixture containing at least two liquid crystal compounds each of which contains at least one structural element of Formula I to IX

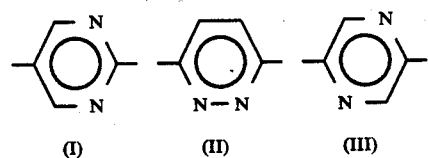

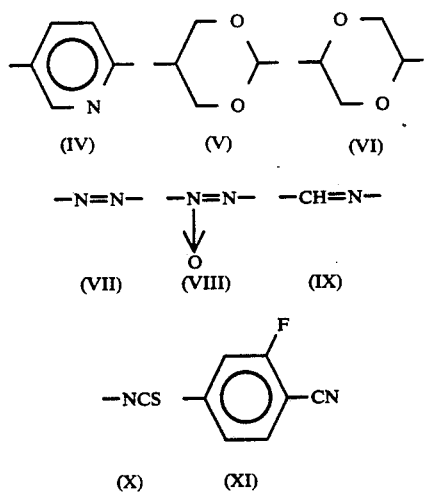

13. The method according to claim 12 for improving the contrast effect of a supertwist cell.

14. The method according to claim 12 characterized in the surface tilt angle of at least one support plate is not more than 10°.

15. The method according to claim 12 wherein the liquid crystalline material contains at least one compound of formula XII

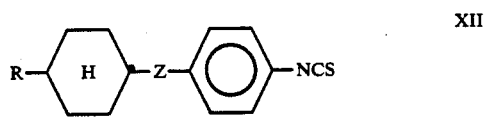

wherein
R is alkyl with 1–15 C atoms, it also being possible for one or two non-adjacent $CH_2$ groups to be replaced by —O—, —CO—, O—CO—, and/or —CH=CH— and
Z is —$CH_2CH_2$— or a single bond.

16. The method according to claim 12 wherein the $K_3/K_1$ is small enough so that the steepness of the characteristic line is improved but the characteristic line remains stable and wherein the liquid crystalline material is a mixture containing at least two liquid crystal compounds each of which contains at least one structural element of Formulae XIII to XV

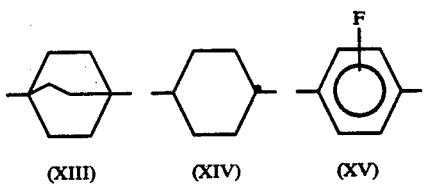

17. The method according to claim 12 wherein the liquid crystalline material contains at least one compound of formula XVI

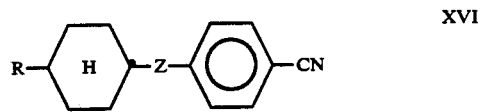

wherein

R is alkyl with 1-15 C atoms, it also being possible for one or two non-adjacent $CH_2$ groups to be replaced by —O—, —CO—, —O—CO— and/or —CH=CH— and Z is —$CH_2CH_2$— or a single bond.

18. The method according to claim 17 wherein R is n-alkyl with 2-7 C atoms and Z is —$CH_2$—$CH_2$—.

19. An electrooptical display element which can be multiplexed, has improved contrast effect, has two support plates which, with an edging, form a cell containing a nematic liquid crystal material with positive dielectric anisotropy and at least one chiral additive; has a characteristic line of the transmission of light through the display element as a function of voltage applied across the cell, and has a small surface tilt angle and a twist angle with a value between 150° and 250°, wherein the ratio of the elastic constants for bending and twisting $K_3/K_2$ of the liquid crystal material and the twist angle are such that when using a liquid crystal material with a ratio of the elastic constants $K_3/K_1$ for bending and spreading which is on the order of the maximum possible, the steepness of the characteristic line is improved but the characteristic line is bistable, or when using a liquid crystal material with a ratio of the elastic constants $K_3/K_1$ for bending and spreading which is on the order of the smallest possible, the steepness of the characteristic line is improved but the characteristic line remains stable.

20. A display element of claim 19 which is based on a supertwist cell.

21. A display element of claim 19 wherein the surface tilt angle of at least one support plate is not more than 10°.

22. A display element of claim 19 wherein $K_3/K_1$ is on the order of the maximum possible and the liquid crystalline material is a mixture containing at least two liquid crystal compounds each of which contains at least one structural element of Formulae I to XI

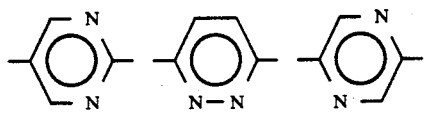

(I)   (II)   (III)

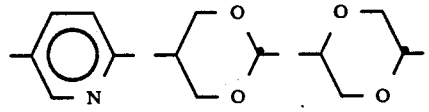

(IV)   (V)   (VI)

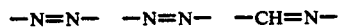

(VII)   (VIII)   (IX)

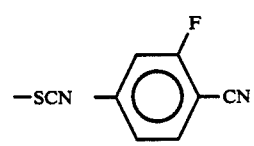

(X)   (XI)

23. A display element of claim 19 wherein $K_3/K_1$ is on the order of the smallest possible and the liquid crystalline material is a mixture containing at least two liquid crystal compounds each of which contains at least one structural element of Formulae XII to XIV

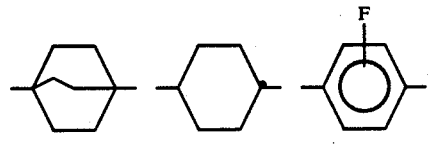

(XII)   (XIII)   (XIV)

* * * * *